J. STEEVER.
PORTABLE ELEVATOR.
APPLICATION FILED DEC. 6, 1913.
1,110,239.
Patented Sept. 8, 1914.
3 SHEETS—SHEET 2.
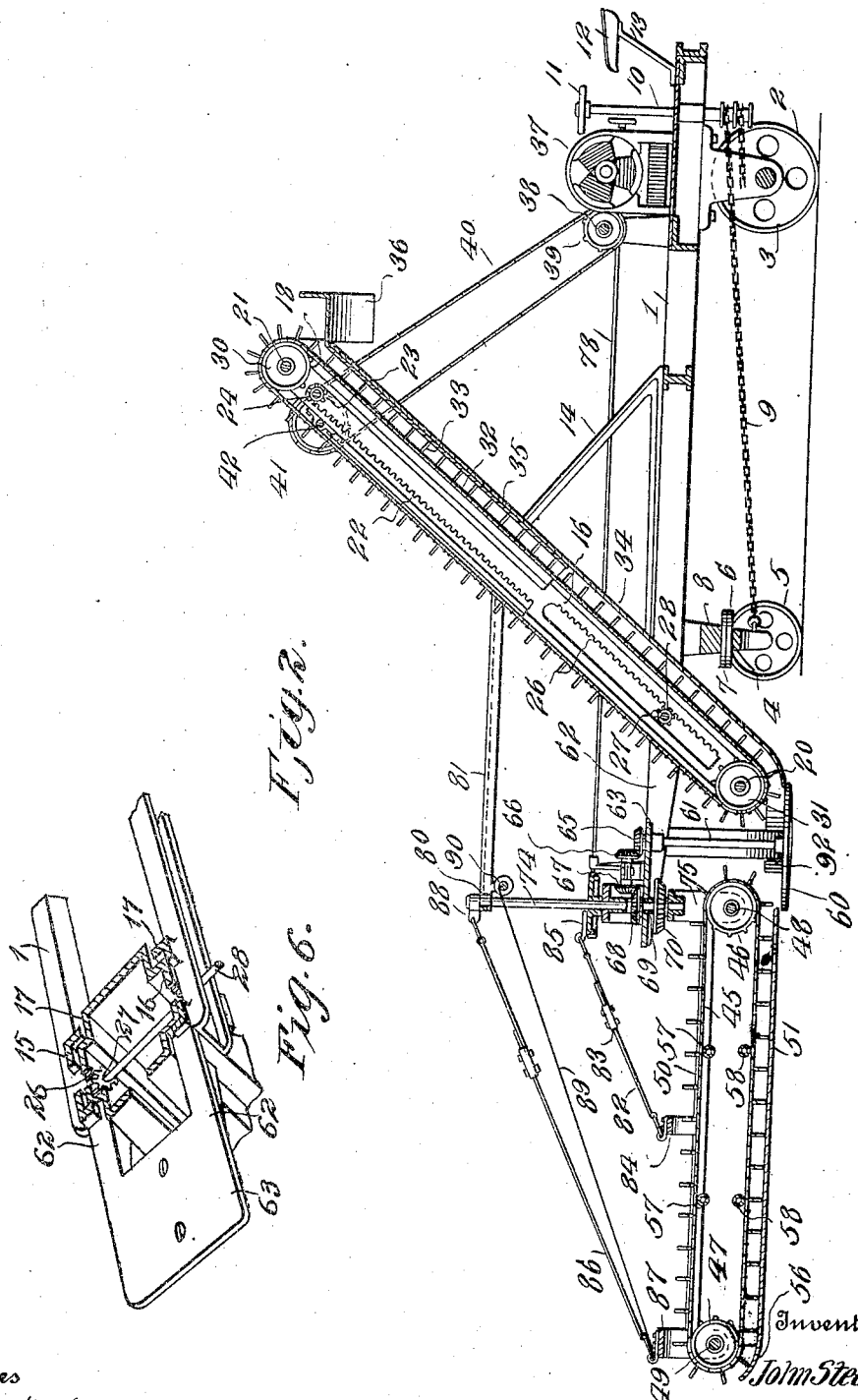

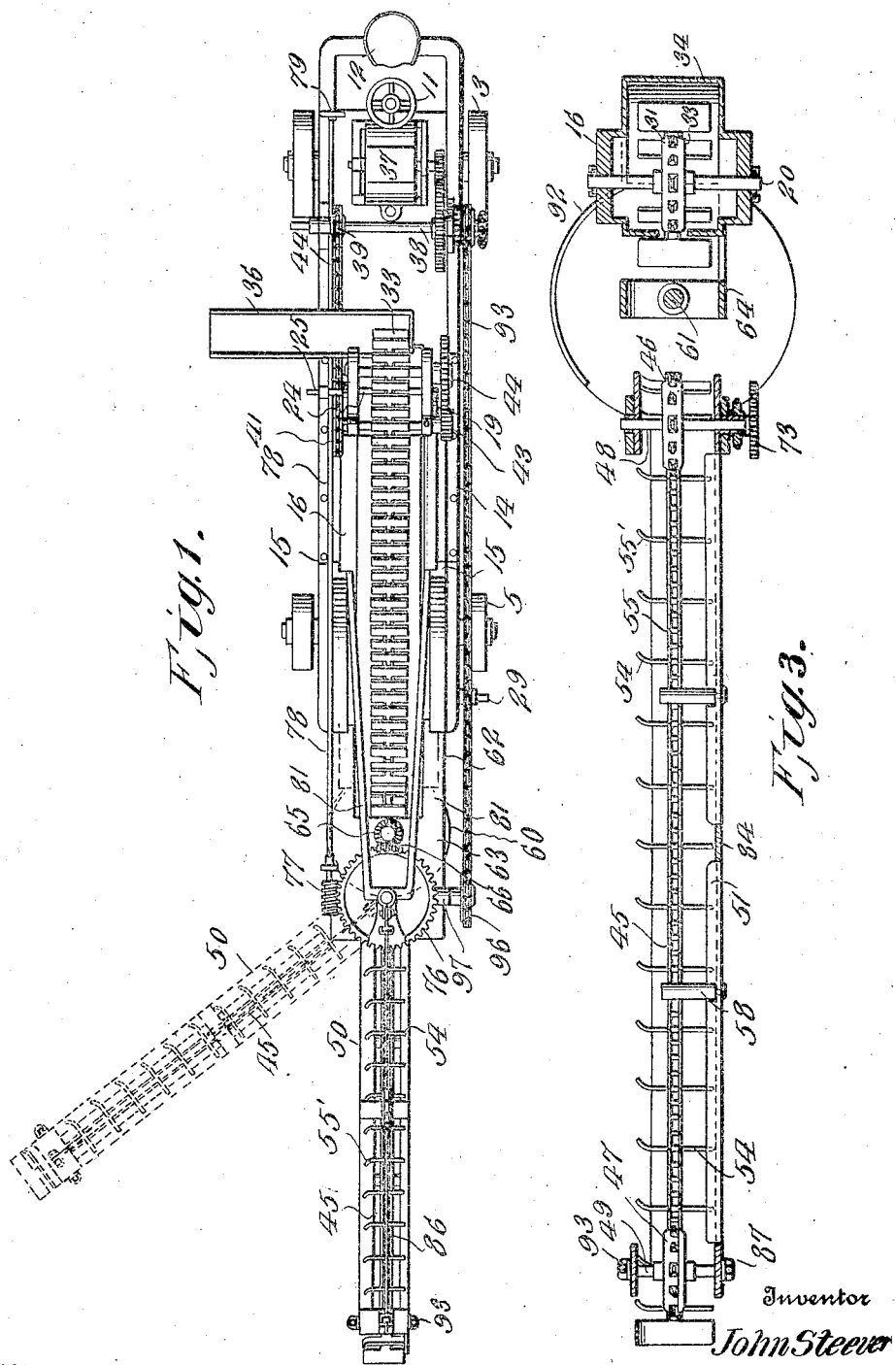

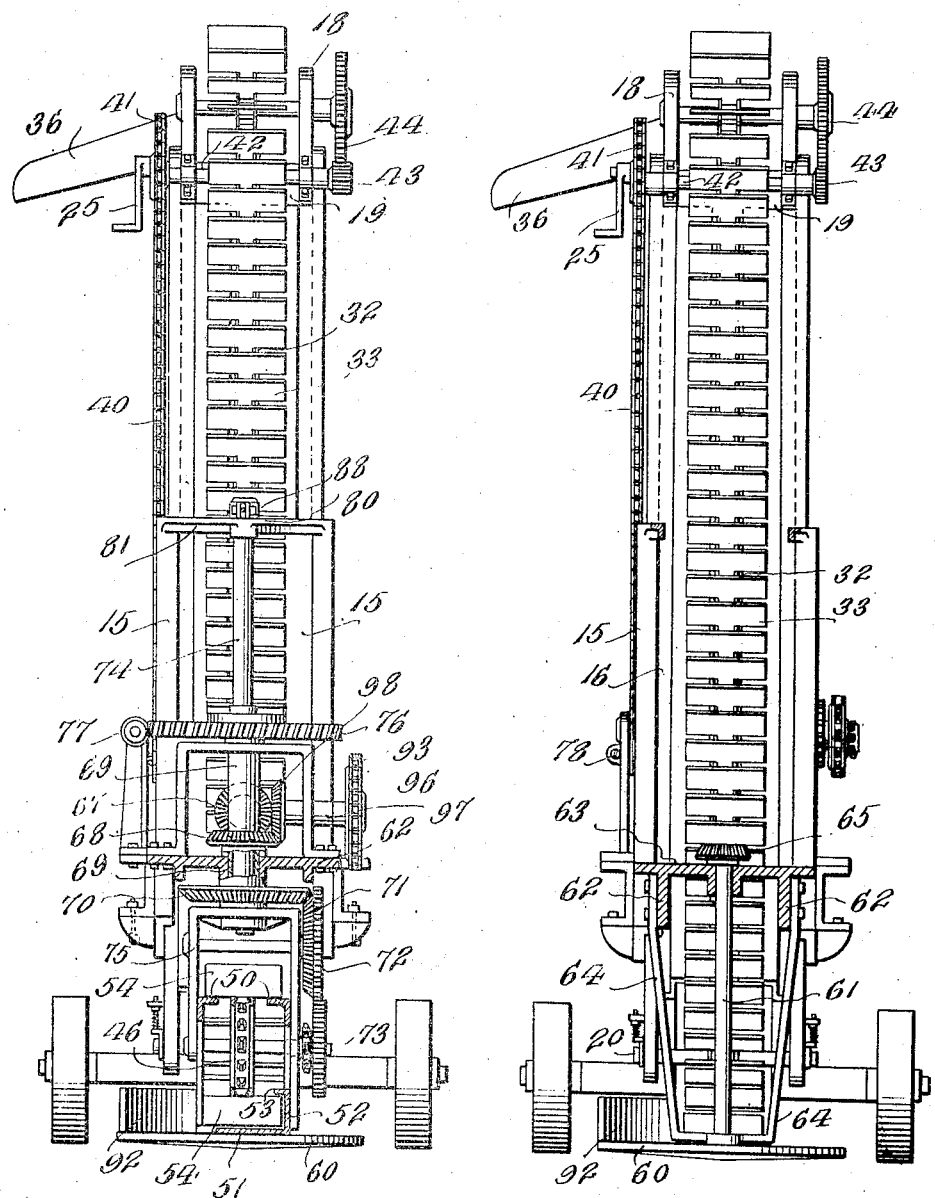

UNITED STATES PATENT OFFICE.

JOHN STEEVER, OF PLYMOUTH, PENNSYLVANIA.

PORTABLE ELEVATOR.

1,110,239.  Specification of Letters Patent.  Patented Sept. 8, 1914.

Application filed December 6, 1913. Serial No. 805,129.

*To all whom it may concern:*

Be it known that I, JOHN STEEVER, a citizen of the United States, residing at Plymouth, in the county of Luzerne and State of Pennsylvania, have invented new and useful Improvements in Portable Elevators, of which the following is a specification.

This invention relates to portable elevators, the object of the invention being to produce a machine of the class referred to which is especially designed for handling building and other materials such as stone, sand, gravel, coal and the like, the machine operating automatically to remove such material gradually and continuously from a pile or heap on the ground and deliver the same to any suitable receiving agent such as a stationary receptacle, carts, cars and other vehicles at a suitable elevation.

One of the principal objects of the invention is to provide a novel construction and arrangement of scraper for initially removing the material from the pile or heap on the ground, combined with an endless elevator for carrying said material to the desired altitude for delivery, and an interposed carrier of novel construction, mounting and operation which receives the material from the gathering scraper and delivers said material to the elevator.

A further object of the invention is to provide means whereby said elevator and the carrier may be adjusted up and down with relation to the supporting truck frame; also means for raising and lowering the outer end of the scraper; also means for swinging or adjusting said scraper in a substantially horizontal plane in order to obtain the proper relation between the scraper and the material so as to produce an even and continuous feed of such material from the pile or heap to the elevator proper.

With the above and other objects in view, the invention consists in the construction, combination and arrangement of parts, as will hereinafter be more fully described, illustrated and claimed.

In the accompanying drawings:—Figure 1 is a plan view of the machine. Fig. 2 is a central vertical longitudinal section through the machine. Fig. 3 is a horizontal section through the machine. Fig. 4 is an enlarged vertical section in line with the vertical axis of movement of the scraper mechanism. Fig. 5 is an enlarged vertical section in line with the vertical operating shaft. Fig. 6 is a detail broken perspective view showing the telescopic relation between the upper and lower sections of the elevator frame.

The portable elevator contemplated in this invention embodies, in the preferred form thereof, a wheeled truck as illustrated, said truck embodying a truck frame 1, a rear axle 2 equipped with carrying wheels 3, and a front axle 4 equipped with wheels 5 and mounted to turn on a central vertical axis as indicated in the drawings, the axle 4 being arched as shown, for example, in Fig. 2 and provided with a disk-shaped bearing plate or fifth wheel 6 which works in contact with the lower side of a corresponding wheel 7 carried by a bolster 8 bearing a fixed relation to the truck frame, the plates or wheels 6 and 7 being pivotally connected together by a vertical king bolt or pivot (not shown) but of the usual construction and arrangement, whereby the axle 4 is adapted to turn for steering purposes. Chains 9 extend from the opposite ends of the axle 4 forward to a vertical steering post 10 around which said chains 9 are wrapped in opposite directions, with a hand wheel 11 arranged within reach of the operator who occupies a seat 12 mounted on a standard 13 as shown secured to the truck frame 1.

Mounted upon and in fixed relation to the truck frame 1 is a triangular-shaped guide frame 14 by which the elevator proper is supported and by means of which said elevator is rendered adjustable in the direction of its length. In carrying out this part of the invention, the triangular frame 14 is provided with parallel flanged guides 15 within and between which the opposite side bars 16 of the lower section of the elevator frame are mounted for sliding movement. By reference to Fig. 6 it will be observed that the side bars or portions 16 are offset outwardly as shown at 17 and the portions 17 are received in the guides 15 so as to enable the elevator frame to be slid upwardly and downwardly in the direction of length of the elevator frame. The upper section 18 of the elevator frame corresponds in its general shape with the lower section 16 as also shown in Fig. 6 but is sufficiently smaller to telescope and house within the lower section 16 and is also provided with the laterally and outwardly offset portions 19 which are slidable in the corresponding portions 17 of the lower elevator frame section 16.

At the lower end of the lower section 16 of the elevator frame is journaled a horizontal shaft 20 while a corresponding shaft 21 is journaled in the upper extremity of the upper telescopic section 18 of the elevator frame. The elevator frame as a whole is thus composed of relatively slidable telescopic sections which provide for lengthening and shortening said elevator frame to accommodate endless chains of different lengths said chains carrying flights or blades as will hereinafter appear. In order to provide for lengthening and shortening said elevator frame, the upper section 18 is provided with a rack face 22 which is engaged by a pinion 23 on a horizontal shaft 24 journaled in bearings in the upper end of the lower elevator frame section 16 and provided with an operating crank handle 25. The lower section 16 of the elevator frame is itself adjustable in the direction of its length by the mechanism shown in Fig. 2 wherein it will be observed that said lower section is, like the upper section provided with a rack race 26 which is engaged by a pinion 27 on a horizontal shaft 28 journaled in the truck frame 1 and provided at one end with an operating crank handle 29. It will now be understood that the elevator frame as a whole may be adjusted up and down in the guide frame 14 which is carried by the truck and that independently of the adjustment just referred to, the upper section of the elevator may be also adjusted for the purpose of lengthening and shortening the frame of the elevator as a whole, enabling said elevator to deliver at higher or lower points as may be found desirable or necessary.

Extending around upper and lower sprocket wheels 30 and 31, respectively mounted on the shafts 21 and 20 above referred to, is an endless elevator chain 32 having secured thereto at equal intervals flights or blades 33. The lower run of said blades travel close to or in contact with the bottom floor of the elevator which as shown in Fig. 2 comprises a lower section 34 and an upper section 35 having a relatively slidable and telescopic connection with each other to provide for the lengthening and shortening of the elevator as a whole, as hereinabove explained. Adjacent to the upper end, the elevator is provided with a discharge opening through which the material carried upwardly by the lower run of blades or flights 33 is discharged into a downwardly inclined discharge chute 36 which overhangs the machine at one side as illustrated, for example, in Figs. 4 and 5 in order that the material may be discharged at a suitable elevation into a receptacle of any character.

The elevator hereinabove described is driven by the following mechanism: 37 designates a motor mounted on the truck frame 1, said motor driving a countershaft 38 provided with a sprocket wheel 39 from which a chain 40 extends upwardly around a sprocket wheel 41, the shaft 42 of which is provided with a pinion 43 which meshes with a spur gear wheel 44 on the upper shaft 21 hereinabove referred to. The scraper used in conjunction with the elevator hereinabove described, embodies an endless chain 45 which travels around sprocket wheels 46 and 47 on horizontal shafts 48 and 49 located respectively at the inner and outer ends of the scraper mechanism as best illustrated in Figs. 2 and 3. The frame of the scraper which is illustrated in cross section in Fig. 4, comprises a pair of parallel top rails 50 of angle iron as shown in Fig. 4 and a horizontal bottom plate or floor 51. Extending upwardly from one of the longitudinal edges of the floor or bottom plate 51 is a vertical guard wall or fence 52 the top edge of which is extended inwardly over the floor 51 as shown at 53 to form a flange which overhangs the bottom run of scraper blades 54, the blades 54 being secured to the chain 55 at suitable intervals and distances apart and the bottom run of said blades being arranged to travel lengthwise of and in contact with the top surface of the bottom floor 51 as clearly shown in Figs. 2 and 3. In Figs. 3 and 4 it will be observed that while the inner extremities of the scraper blades 54 travel in close proximity to or contact with the vertical guard wall or fence 52, the opposite extremities of said blades 54 extend beyond the opposite lateral longitudinal edge of the floor or bottom plate 51 and that the outer extremity of each of said blades is deflected toward the discharge end of the scraper as clearly indicated at 55', the object being to gather in the material from the heap or pile and cause the same to be deposited upon the bottom plate or floor 51 along which it is subsequently swept or scraped by the blades 54 until discharged upon the rotary disk-conveyer hereinafter more particularly described.

The projecting extremity of the floor or bottom plate 51 is upturned as shown at 56 to prevent the same from catching in the ground or pile of material being operated upon. 57 and 58 respectively designate upper and lower chain supporting rollers, the same acting to hold the respective upper and lower runs of the chain in proper alinement, the upper run of blades 54 traveling above the angle iron top rails 50 as shown in Fig. 4.

In conjunction with both the elevator and the scraper hereinabove described in detail, I employ a rotary disk conveyer 60 which operates in a substantially horizontal plane and turns on a vertical axis, said conveyer underlying the discharge end of the scraper and the receiving end of the elevator as clearly shown, for example, in Fig. 2 and being fast on the lower extremity of a vertical operating shaft 61. In order to support the shaft 61 so that the disk conveyer may be adjusted up and down with the elevator, the frame of the elevator is provided with a pair of forwardly extending arms 62 which are connected by a cross bar 63 as best illustrated in Figs. 2 and 5, the upper end of the shaft 61 being journaled in a bearing in the cross bar 63 while the lower end of said shaft is journaled in the bottom of a U-shaped frame or hanger 64 secured to and extending downwardly from the arms 62 and having a rigid relation to said arms. On its upper extremity the shaft 61 is provided with a bevel pinion 65 which meshes with and is driven by another bevel pinion 66 fast on one end of a short horizontal shaft on the opposite end of which is another bevel pinion 67 which meshes with and is driven by a bevel gear wheel 68 fast on a tubular shaft or sleeve 69 journaled in the cross bar 63 above referred to. Fast on the lower end of the tubular shaft or sleeve 69 is a bevel gear wheel 70 which meshes with a bevel gear wheel 71 on the same shaft with a spur gear wheel 72 which meshes with another spur gear wheel 73 on the shaft 48 which carries the sprocket wheel 46 that imparts motion to the chain 45 carrying the scraper blades 54.

The sleeve 69 surrounds a vertical shaft 74 forming the vertical axis on which the scraper mechanism as a whole is adapted to turn in order to move the scraper laterally in one direction or the other in a substantially horizontal plane. The lower end of the shaft 74 is fixedly connected to an inverted U-shaped extension 75 of the frame of the scraper so that when said shaft 74 is turned, the scraping mechanism as a whole is correspondingly turned. In order to turn the shaft 74 for the purpose of adjusting the scraping mechanism laterally to properly engage the pile or heap of material, the shaft 74 has fast thereon a worm wheel 76 which is engaged by a worm 77 fast on the forward end of a worm shaft 78 journaled in suitable bearings on the truck frame and provided at the rear end thereof with a hand wheel 79 within reach of the operator in his seat 12. By the mechanism just referred to the operator may swing the entire scraping mechanism horizontally so as to maintain the scraper blades in proper contact with the heap or pile of material being gathered thereby and conducted to the rotary disk conveyer 31.

In order to brace the upper end of the shaft 74, I provide a crosshead 80 in which said shaft is journaled, and braces 81 extend therefrom to the frame of the lower section of the elevator, all of the mechanism just described being therefore adjustable up and down with the elevator. 82 designates a longitudinally extensible rod or stay equipped with a turn buckle 83 and extending from an inverted U-shaped yoke 84 on the scraper frame to a clip 85 secured to the upper side of the worm wheel 76. Another longitudinally extensible stay rod 86 is interposed between another inverted U-shaped yoke 87 at the extreme end of the scraper frame, and a clip 88 on the upper extremity of the scraper turning shaft 74. The outer extremity of the scraper frame may be slightly raised and lowered by means of a flexible cable 89 secured at one end to the yoke 87 and wrapped at its other end around a shaft 90 provided at one end with an operating crank 91 in connection with which any suitable mechanism such as pawl and ratchet elements may be used for preventing the shaft 90 from turning backwardly.

In addition to the horizontal swinging movement of the scraper frame, and the mechanism carried thereby, it will also be observed that the scraper frame is adapted to be swung upwardly and downwardly in a vertical plane on the shaft 48 as a center, said shaft 48 being carried by the frame or yoke 75 above referred to which is fast on the lower end of the shaft 74. This provides in effect a universal joint connection between the scraper and the arms 62 of the elevator frame which enables the scraper to be adjusted at any angle whatsoever with relation to the elevator frame by which it is carried and to which it is connected by such universal joint.

It will now be understood that the frame of the elevator may be raised and lowered and that when in actual operation it occupies a substantially horizontal position close to or in contact with the ground so as to remove the pile beginning at the edge of the bottom of such pile. It will be seen that the scraper blades 54 project from one side of the floor of the scraper, engage the material and drag the same inwardly upon the floor or bottom of the elevator and then drag such material in the direction of the conveyer 60. The material is thus deposited continuously on the rotary disk scraper and is kept from escaping from the edge or margin thereof by a curved guard 92 which is non-rotative and which is located directly over the upper surface of said rotary conveyer, said guard being attached at one end to the elevator frame so as to direct the material into the path of the flights or blades of the elevator by which the material is then picked up and carried along the inclined floor of the elevator and finally discharged into the chute 36 and from the machine into a suitable receptacle at one side thereof.

What I claim is:

1. In a portable elevator of the class described, a wheeled truck frame, an endless elevator carried thereon, an endless scraper operating in a substantially horizontal plane, and a rotary disk conveyer which receives the material from the scraper and delivers said material to said elevator.

2. In a portable elevator of the class described, a wheeled truck frame, an endless elevator carried thereon, an endless scraper operating in a substantially horizontal plane, and a rotary disk conveyer which receives the material from the scraper and delivers said material to said elevator, said disk conveyer operating in an approximately horizontal plane.

3. In a portable elevator of the class described, a wheeled truck frame, an endless elevator carried thereon, an endless scraper operating in a substantially horizontal plane, and a rotary disk conveyer which receives the material from the scraper and delivers said material to said elevator, said disk conveyer being supported by and movable with the frame of said endless elevator.

4. In a portable elevator of the class described, a wheeled truck frame, a longitudinally adjustable endless elevator carried thereon, an endless scraper operating in a substantially horizontal plane, and a vertically adjustable rotary disk conveyer which receives the material from the scraper and delivers said material to said elevator.

5. In a portable elevator of the class described, a wheeled truck frame, an endless elevator carried thereon, an endless scraper operating in a substantially horizontal plane, a rotary disk conveyer which receives the material from the scraper and delivers said material to said elevator, said disk conveyer operating in an approximately horizontal plane, and a non-rotating guard located above said disk conveyer.

6. In a portable elevator of the class described, a wheeled truck frame, an endless elevator carried thereon, an endless scraper operating in a substantially horizontal plane, and a rotary disk conveyer which receives the material from the scraper and delivers said material to said elevator, said scraper being mounted for swinging movement in a substantially horizontal plane.

7. In a portable elevator of the class described, a wheeled truck frame, an endless elevator carried thereon, an endless scraper operating in a substantially horizontal plane, and a rotary disk conveyer which receives the material from the scraper and delivers said material to said elevator, said scraper being mounted for swinging movement in a substantially vertical plane.

8. In a portable elevator of the class described, a wheeled truck frame, an endless elevator carried thereon, an endless scraper operating in a substantially horizontal plane, and a rotary disk conveyer which receives the material from the scraper and delivers said material to said elevator, said scraper being supported by the frame of said elevator and also connected therewith by a universal joint.

9. In a portable elevator of the class described, a wheeled truck frame, an endless elevator carried thereon, an endless scraper operating in a substantially horizontal plane, a rotary disk conveyer which receives the material from the scraper and delivers said material to said elevator, said scraper embodying a scraper frame, and a floor over and above which the scraper blades travel.

In testimony whereof I affix my signature in presence of two witnesses.

JOHN STEEVER.

Witnesses:
ABDIEL PHILLIPS,
WILLIAM REESE.